Figure 1:
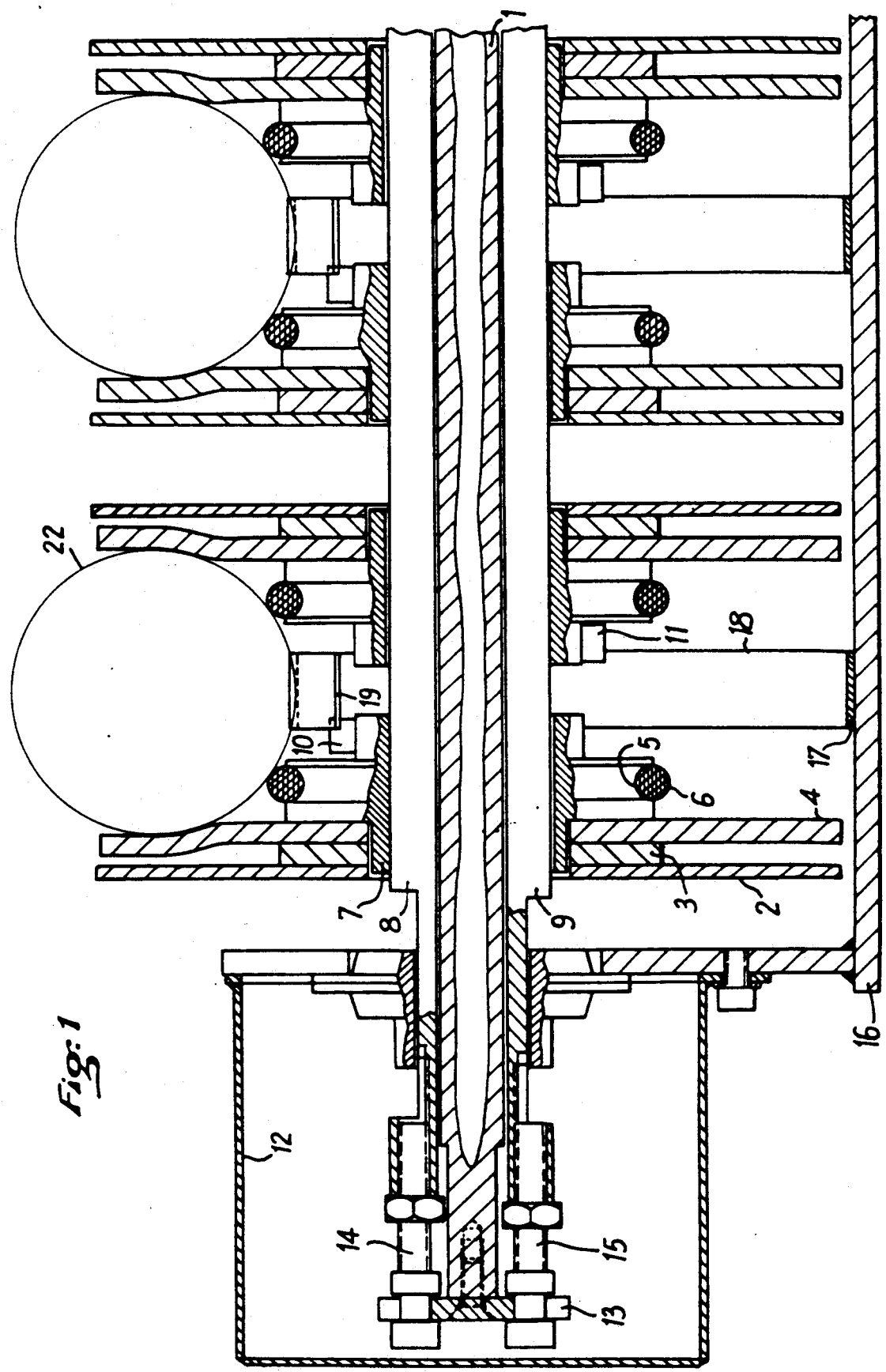

United States Patent [19]

Gomez

[11] Patent Number: 5,029,694
[45] Date of Patent: Jul. 9, 1991

[54] BOTTLE ERECTING DEVICE
[75] Inventor: Robert Gomez, Drancy, France
[73] Assignee: A.T.M., Darcy, France
[21] Appl. No.: 430,678
[22] Filed: Nov. 1, 1989
[30] Foreign Application Priority Data Nov. 9, 1988 [FR] France ................. 8814627

[51] Int. Cl.⁵ .............................. B65G 15/00
[52] U.S. Cl. .......................... 198/408; 198/411; 198/624
[58] Field of Search ............ 198/408, 411, 400, 624, 198/835

[56] References Cited

U.S. PATENT DOCUMENTS

| 2,593,627 | 4/1952 | Stover | 198/404 |
| 4,148,390 | 4/1979 | Ionescu | 198/400 |
| 4,199,049 | 4/1980 | Vamvakas | 198/408 |
| 4,213,526 | 7/1980 | Graham et al. | 198/408 X |
| 4,463,846 | 8/1984 | Ionescu | 198/400 X |

FOREIGN PATENT DOCUMENTS

| 0030304 | 6/1981 | European Pat. Off. | |
| 0202148 | 11/1986 | European Pat. Off. | |
| 1757702 | 6/1968 | Fed. Rep. of Germany | |
| 665939 | 10/1965 | France | 198/408 |
| 2083158 | 12/1971 | France | |
| 2223273 | 10/1974 | France | |
| 135026 | 10/1980 | Japan | 198/408 |

Primary Examiner—Robert P. Olszewski
Assistant Examiner—Cheryl L. Gastineau
Attorney, Agent, or Firm—Darby & Darby

[57] ABSTRACT

An erecting device for bottles transported in recumbent position by a rope conveyor rotates the bottles to an upright position and deposits them on an apron conveyor which is positioned at a lower level at the end of the rope conveyor. The erecting device includes a pulley having two outer flanges, a pair of washers between the flanges and a pair of deformable rubber disks between the washers for holding a bottle during rotation from the recumbent to the vertical position. Each outer flange is connected to the rotating pulley axle by a respective intermediate cotter. The cotters are adjustably translatable along the length of the pulley axle such that the spacing between the rubber disks is adjustable to accommodate different bottle dimensions.

5 Claims, 2 Drawing Sheets

BOTTLE ERECTING DEVICE

The invention relates to a bottle erecting device, mainly applicable to conveyors of glass bottles.

In some processes, for example sterilization processes, bottles, of a general cylindrical form, are arranged lying down. At the end of the sterilization machine, the lying bottles are transported on cylindrical belt conveyors, or rope conveyors, and they are then erected so as to arrive upright at the packing station. To erect the bottles, they can be dropped onto another apron conveyor placed under the end of the rope conveyor. In the case of glass bottles filled with liquid, the fall of the bottle onto the apron causes breakage of the glass and shattering of the bottle, the more so as the bottles coming out of the sterilizer is subjected to thermal and mechanical stresses, and the more so again as the apron is of metal for reasons of hygiene and easy cleaning.

It is an object of the invention to propose a bottle erecting device able to avoid the fall of the bottles onto the apron and consequently able to avoid breakage.

The invention relates to a device for erecting recumbent bottles transported by a rope conveyor, and intended to be transported upright on an apron conveyor placed under the end of the rope conveyor, characterized in that, in each end pulley of the rope conveyor provided with two outer flanges, it comprises: on either side of the pulley a washer placed against the flange and a deformable rubber disk to hold a bottle during its rotation; and at the center of the pulley, an arm extending vertically from the height of the axle of the pulley to the level of the apron of the conveyor so as to guide the bottle to its position of deposition on the apron.

According to other characteristics of the invention:

a heavy roller is placed on top of the pulley so as to hold the bottle against the ropes of the conveyor during its penetration into the pulley;

the roller is carried by an arm articulated on an axle and urged downward by a spring;

each pulley consists of two symmetrical half-pulleys each fastened to the axle by means of a cotter, the relative axial displacement of the two cotters entraining the corresponding relative displacement of the two half-pulleys.

The invention has as its object also the application of this device to the erection of glass bottles.

Figure 2:
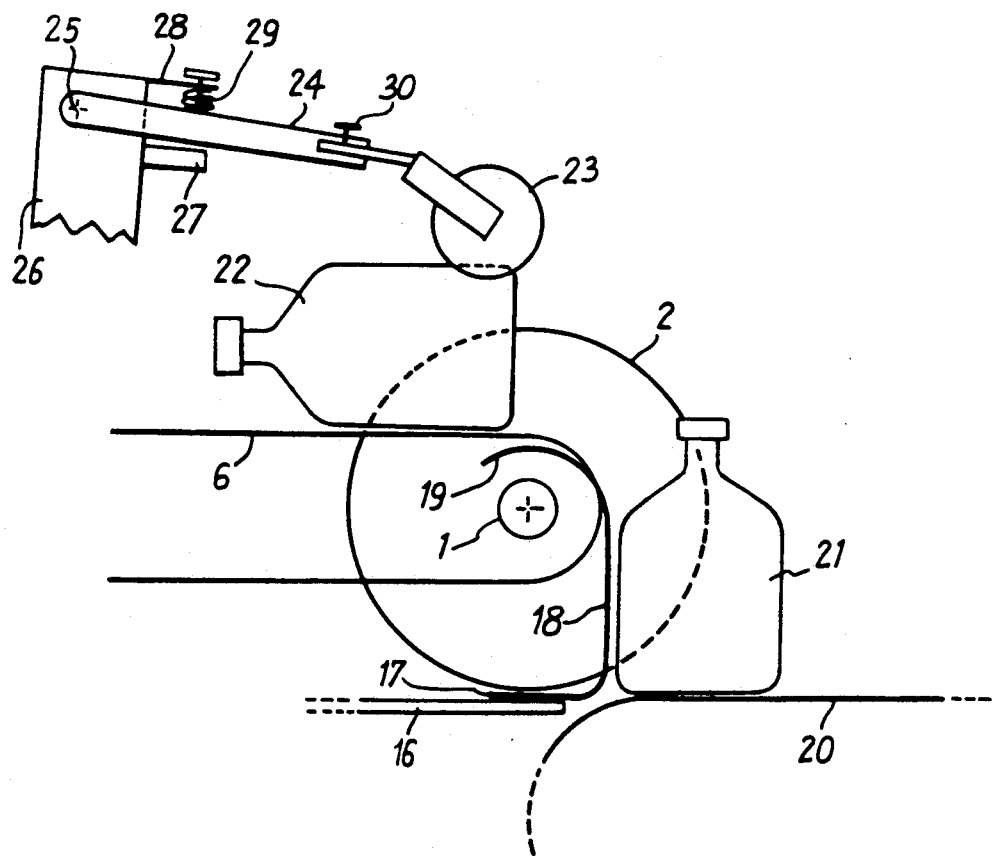

The attached drawing shows by way of example:

FIG. 1 a view in vertical axial section of the bottle erecting device according to the invention;

FIG. 2 a side view of the bottle erecting device according to the invention.

The erecting device according to the invention consists in a special arrangement of the end pulleys downstream of a multiple rope conveyor. In the example of FIG. 1, two conveyor elements have been represented, but they may be more numerous. Furthermore, the erecting device according to the invention is able to erect series of cylindrical bottles of different diameters. To this end it comprises a means for adjusting the spacing of the flanges of the pulleys.

Referring to FIG. 1, it is seen that the bottle erecting device according to the invention includes an axle 1, for example driven at its end not shown, and on which are disposed pulleys, each consisting of two symmetrical halves. Each half-pulley includes, from the outside toward the inside: a metal flange 2, a plastic washer 3, a rubber disk 4 of a diameter close to that of flange 2, and a notch 5 in which the cylindrical rope or belt 6 moves. These various elements are carried by a hub 7.

The axle 1 carries two longitudinal cotters 8 and 9 diametrically opposite each other. The hub 7 of the half-pulley at left is made fast to cotter 8 by a bolt 10. In like manner, the hub of the half-pulley at right is made fast to cotter 9 by a bolt 11. Thus, each half-pulley is fastened to a cotter. The half-pulleys at left are fastened to cotter 8, and the half-pulleys at right are fastened to cotter 9. Thus, a relative longitudinal movement of the two cotters 8 and 9 brings about a corresponding movement of the two half-pulleys of each of the pulleys carried by the axle 1. The spacing of the flanges of each pulley can thus be adjusted to adapt it to the diameter of the bottles to be erected.

This adjustment of the spacing of the flanges, or of the relative position of the two cotters 8 and 9, occurs at the axle neck. Under the protective hood 12, the axle 1 carries at its end a plate 13 in which turn two threaded rods 14, 15.

These threaded rods penetrate into the tapped end of the cotters 8 and 9, respectively. By rotation of the threaded rods 14 and 15, it is thus possible to control the longitudinal displacement of the cotters 8 and 9. Thereby the spacing of the rubber disks 4 is adjusted to a value slightly less than the diameter of the bottle 22 (FIG. 1).

Referring to FIG. 2, there is seen a pulley flange 2, a cylindrical rope or belt 6 conveying a recumbent bottle 22, and an upright bottle 21 ready to be taken along by an apron conveyor 20.

The assembly of the pulleys of the rope conveyor of FIG. 1 is placed in a frame whose bottom 16 ends at right angles to the pulleys (FIG. 2). For each pulley there is disposed on this bottom 16 a ramp consisting of a foot 17 for attachment to the frame and of an arm 18 substantially perpendicular to the bottom of the frame, extending vertically to the height of the axle 1 of the pulleys and then curving toward the interior of the pulley and terminating in an end 19 below the upper strands of the ropes 6 of the conveyor.

The upper end of the vertical portion of arm 18, which is prolonged by the curved portion of said arm, is practically between the two ropes of a pulley, at the height of the axle 1 relative to the frame.

When bottle 22 arrives near the pulley of the rope conveyor, it comes with the bottom forward (FIG. 2). The bottom and then the body of the bottle pass over the end 19 of arm 18. The body of the bottle is progressively held between the rubber disks 4 of the pulley, which yield as shown in FIG. 1. To ensure that the bottles are gripped by the rubber disks, above each pulley of the rope conveyor a heavy roller 23 is disposed, carried by an arm 24 able to pivot on a horizontal axle 25 carried by a stirrup 26 integral with frame 16. This stirrup 26 presents a lower plate 27 on which rests the arm 24 serving as abutment for a spring 29 whose function is to urge arm 24 downward. Arm 24 is composed of two parts sliding one in the other and attached to one another by a screw 30 for example. The length of arm 24 is thus adjustable according to the diameter of the bottle.

When a bottle 22 appears, the heavy roller 23 holds it against the ropes of the conveyor, during the deformation of the rubber disks 4, thus preventing the bottle from being pushed toward the outside of these disks. Thus held by the deformed disks (FIG. 1), the bottle is taken along by the pulley, which rotates a quarter turn and erects the bottle in vertical position. When the pulley continues to rotate, the bottle runs up against the vertical portion of arm 18 to the position represented at 21 in FIG. 2, while being held by the rubber disks 4. In the course of its vertical descent, the bottle is held less and less by the rubber disks, so that when it sets down on the apron 20 it is practically no longer held and is taken along by the apron 20 toward the packing station. The gradual release of the bottle by the disks ensures that the bottle is placed on the apron 20 without falling and hence without danger of breakage of the glass bottle.

The adjustment of the spacing of the half-pulleys is adjusted so that the bottle is held without being either let go during its descent or being retained after its descent.

The erecting device according to the invention ensures the deposition of the bottle on the metal apron conveyor without shock. It is in fact necessary to avoid not only a hard impact that would cause immediate breakage of the bottle, but also a light impact that would bring about an undetectable crack in the packing station. Such a crack involves a risk of subsequent leakage and especially loss of the sterility of the product, which is particularly serious for injectable products for example.

The erecting device has been described in the case of a bottle; it is perfectly suitable for glass jars and flasks.

When the diameters of the bottles vary from one series to another, the spacing of the flanges is adjusted beforehand by adjusting the relative position of the two cotters 8 and 9 on axle 1, and if necessary adjusting the length of the telescoping arm 24 so that the roller 23 will firmly apply against the bottle to be erected.

I claim:

1. An erecting device for bottles transported in recumbent position by a rope conveyor and intended to be rotated and then transported upright on an apron conveyor which is positioned at a lower level at the end of said rope conveyer, comprising:

an end pulley having a rotating axle, said rope conveyor passing around said end pulley, said end pulley including two flanges, a pair of washers between said flanges, each one of said washers being positioned against a respective flange, a pair of deformable disks between said washers for holding a bottle during said rotation, one said disk being positioned against a respective one of said washers;

a vertically extending arm centered between said disks, one end of said arm extending substantially to the level of said apron conveyor, the other end of said arm extending at least proximate the level of said end pulley axle, said arm for guiding a bottle from said rope conveyor to its position of deposition on said apron conveyor;

a pair of cotters, each said flange being connected to a respective one of said pair of cotters, each said cotter being connected to said axle for rotation therewith and subject to independent translation along said axle, the position of each said flange along said axle being independently, selectably adjustable by translation of the respectively associated cotter; and means for translating said cotters on said axle for adjusting the spacing between said disks.

2. An erecting device as in claim 1, and further comprising a roller positioned above said end pulley for resting on a recumbent bottle and for holding said bottle against said rope conveyor while said bottle is conveyed into said spacing between said disks.

3. An erecting device as in claim 2, and further comprising a frame and an arm pivotably mounted to said frame for supporting said roller, and a spring acting on said arm to press said arm and roller toward said rope conveyor.

4. An erecting device as in claim 1, wherein said end pulley is axially and radially symmetrical with said axle.

5. An erecting device as in claim 1, wherein said deformable disks are fabricated of rubber.

* * * * *